US010417073B2

United States Patent
Ackerman

(10) Patent No.: US 10,417,073 B2
(45) Date of Patent: Sep. 17, 2019

(54) APPLICATION SERVER DEPLOYMENT SYSTEM FOR DOMAIN GENERATION AND TESTING WITH AN ADMINISTRATIVE SERVER VIRTUAL MACHINE AND MANAGED SERVER VIRTUAL MACHINES

(71) Applicant: Bank of America Corporation, Charlotte, NC (US)

(72) Inventor: Kevin J. Ackerman, Albany, NY (US)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 15/485,485

(22) Filed: Apr. 12, 2017

(65) Prior Publication Data
US 2018/0300117 A1    Oct. 18, 2018

(51) Int. Cl.
*G06F 8/60* (2018.01)
*G06F 11/07* (2006.01)

(52) U.S. Cl.
CPC .......... *G06F 11/0766* (2013.01); *G06F 8/60* (2013.01)

(58) Field of Classification Search
None
See application file for complete search history.

(56) References Cited

U.S. PATENT DOCUMENTS

| | | |
|---|---|---|
| 5,155,847 A | 10/1992 | Kirouac et al. |
| 5,696,895 A | 12/1997 | Hemphill et al. |
| 5,835,911 A | 11/1998 | Nakagawa et al. |
| 6,006,035 A | 12/1999 | Nabahi |
| 6,202,206 B1 | 3/2001 | Dean et al. |
| 6,286,041 B1 | 9/2001 | Collins, III et al. |
| 6,463,528 B1 | 10/2002 | Rajakarunanayake et al. |
| 6,622,136 B2 | 9/2003 | Russell |
| 7,861,243 B2 | 12/2010 | Narayanaswamy et al. |
| 7,958,485 B2 | 6/2011 | Steiner et al. |
| 8,321,682 B1 | 11/2012 | Read et al. |
| 8,359,593 B2 | 1/2013 | Golosovker et al. |
| 8,447,963 B2 | 5/2013 | Kraus et al. |
| 8,549,315 B2 | 10/2013 | Read et al. |
| 9,047,133 B2 | 6/2015 | Winterfeldt et al. |
| 9,052,961 B2 | 6/2015 | Mangtani et al. |

(Continued)

OTHER PUBLICATIONS

Bea Weblogic Server, Configuring and Managing Weblogic Server, Version 8.1, Revised Jun. 28, 2006, Copyright 2004-2005, Bea Systems, Inc.; 222 pages.

*Primary Examiner* — Meng Ai T An
*Assistant Examiner* — Zujia Xu
(74) *Attorney, Agent, or Firm* — Michael A. Springs; Moore & Van Allen PLLC; Peter B. Stewart

(57) ABSTRACT

Embodiments of the present invention provide a system for building out and testing a wide range of server systems configured to meet varied use cases across a large enterprise. The systems described herein provide automated solutions for building out a domain that is specific to a user's use case needs, across multiple product versions, and within a large enterprise environment comprising rigorous security protocols. Generally, the system automates certain domain creation functions, automatically shuts down, starts up, and monitors functions as they occur in the domain to identify any potential errors. Additionally, techniques are described to build out and test adjustments to currently-existing domains in the same manner.

20 Claims, 7 Drawing Sheets

(56) References Cited

U.S. PATENT DOCUMENTS

| | | |
|---|---|---|
| 9,100,283 B2 | 8/2015 | Kraus et al. |
| 9,170,798 B2 | 10/2015 | Nagaraja et al. |
| 9,176,722 B1 | 11/2015 | Ackerman |
| 9,542,222 B2* | 1/2017 | Mousseau |
| 2002/0112232 A1 | 8/2002 | Ream et al. |
| 2003/0195921 A1 | 10/2003 | Becker et al. |
| 2009/0249279 A1* | 10/2009 | Bourdon .................. G06F 8/61 717/101 |
| 2009/0293053 A1 | 11/2009 | Knatcher |
| 2010/0058327 A1 | 3/2010 | Dehaan |
| 2011/0154091 A1* | 6/2011 | Walton ................ G06F 11/0712 714/2 |
| 2011/0246981 A1 | 10/2011 | Braun et al. |
| 2013/0167147 A1 | 6/2013 | Corrie et al. |
| 2013/0198309 A1* | 8/2013 | Muller .................. G06F 9/526 709/210 |
| 2015/0269213 A1* | 9/2015 | Avati ................ G06F 17/30368 707/693 |

\* cited by examiner

APPLICATION SERVER DEPLOYMENT SYSTEM FOR DOMAIN GENERATION AND TESTING WITH AN ADMINISTRATIVE SERVER VIRTUAL MACHINE AND MANAGED SERVER VIRTUAL MACHINES

FIELD OF THE INVENTION

The present invention is generally directed to a system for building out and testing a domain.

BACKGROUND

Building out, testing, and deploying a server system can be hindered with several technical issues like security protocols, variance of use cases for the server system, communication problems between remote servers, and the like.

Therefore, a need exists to provide a guaranteed and consistent installation outcome for web application server software that aligns to security baselines and security standards. Additionally, it would be beneficial to provide a solution that is versatile enough to cover all use cases for multiple lines of business within an organization, without requiring a separate solution for each use case.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for deploying a server system, whereby the system communicates requests to host servers for the purpose of executing instructions on the host servers. The system embodiments may comprise one or more memory devices having computer-readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a plurality of original parameters comprising hardware, software, and network information associated with building a domain, wherein the domain is new, and configuring the domain based on the received plurality of original parameters, wherein creating the domain comprises basic properties of the domain, including an administrative server virtual machine (VM) associated with an administrative host server. Additionally, the system may start the administrative server VM; monitor an administrative server VM log file to determine that the administrative server VM starts up correctly; and run a domain online configuration script. Furthermore, the system may shut down the administrative server VM and monitor an administrative server VM log file to determine that the administrative server VM shut down correctly. Additionally, the system may remove any content from the administrative server VM log file; start up the administrative server VM via a custom start script; and monitor the administrative server VM log file to determine that the administrative server VM starts up correctly. Furthermore, the system may shut down the administrative server VM and monitor the administrative server VM log file to determine that/whether the administrative server VM shut down correctly. Additionally, the system may store any domain configuration files in a compressed file; create and store log directories for the domain configuration files on each of one or more managed server VMs associated with one or more managed host servers; transfer the compressed file comprising the domain configuration files to each of the managed server VMs; and unpack the compressed file at each of the managed server VMs.

The system may further include steps of configuring a node manager for the administrative host server and each of the managed host servers, and monitoring a node manager VM log file on each of the managed server VMs to determine that the node managers are successfully configured. Additionally, the system may start up the administrative server VM using the node manager and monitor the administrative server VM log file to determine that the administrative server VM starts up correctly. Furthermore, the system may assign the node manager to the domain; shut down the administrative server VM using the node manager; and monitor the administrative server VM log file to determine that the administrative server VM shuts down correctly. Furthermore, the system may shut down the node manager; start up the node manager; and monitor a node manager VM log file to determine that the node manager starts up correctly. Additionally, the system may start up the administrative server VM using the node manager; monitor the administrative server VM log file to determine that the administrative server VM starts up correctly; start up each managed server VM, for each of the one or more managed server VMs; and monitor managed server VM log files to determine that each managed server VM starts up correctly.

In some embodiments of the system, the system may, in response to configuring the new cluster of managed server VMs in the domain, generate a unique and random password string that is specific to each managed server VM in the new cluster of managed server VMs; encrypt each of the unique and random passwords for each of the managed server VM in the new cluster of managed server VMs; and store each of the encrypted passwords on their respective managed server VM in the new cluster of managed server VMs.

In some embodiments, the system further includes checking one or more managed hosts for cryptographic protocols, in response to receiving the plurality of original parameters. Additionally, the system may check a plurality of ports to determine whether there are any port conflicts; check for system level entropy; check to see if the domain already exists; determine whether product binaries are currently installed; and define functions based on the received original parameters.

Furthermore, in some embodiments, the system may, in response to configuring the domain, generate a unique and random password string that is specific to the domain; encrypt the unique and random password; and store the encrypted password.

In some embodiments, the system may, in response to unpacking the compressed file, generate a unique and random password string that is specific to each of the managed server VMs; encrypt each of the unique and random passwords for each of the managed server VMs; and store each of the encrypted passwords on their respective managed server VM.

In some embodiments, the system further includes, in response to monitoring the managed server VM log files to determine that each managed server VM starts up correctly, connect each managed server VM to the node manager.

Some embodiments of the system include, in response to enrolling each of the managed server VMs in the domain with the node manager, starting up a program to be executed on the managed server VMs, based on the received plurality of original parameters; monitoring the managed server VM log files to determine that/whether the program starts up correctly; shutting down the program to be executed on the managed server VMs; and monitor the managed server VM log files to determine that/whether the program shuts down correctly.

In some embodiments, the system may provide a report that the domain is prepared for deployment.

Furthermore, in some embodiments of the system, the system may provide an error log report in response to: the administrative server VM log file determining that the administrative server VM does not start up correctly; the administrative server VM log file determining that the administrative server VM does not shut down correctly; one of the managed server VM log files determining that the one of the managed server VMs does not start up correctly; one of the managed server VM log files determining that the one of the managed server VMs does not shut down correctly; the node manager VM log file determining that the node manager does not start up correctly; or the node manager VM log file determining that the node manager does not shut down correctly.

In some embodiments of the system, the system may be further configured to receive, via said communication device, a plurality of new parameters comprising hardware, software, and network information associated with adjusting the domain; configure a new cluster of managed server VMs in the domain; shut down the administrative server VM; and monitor the administrative server VM log file to determine that the administrative server VM shuts down correctly. Furthermore, the system may start up the administrative server VM using the node manager; monitor the administrative server VM log file to determine that the administrative server VM starts up correctly; start up each managed server VM, for each of the one or more managed server VMs; and monitor managed server VM log files to determine that each managed server VM starts up correctly. In some embodiments, the system may enroll each of the managed server VMs in the domain with the node manager; shut down each managed server VM; and monitor the managed server VM log files to determine that each managed server VM shut down correctly. Furthermore, the system may shut down the administrative server VM; monitor the administrative server VM log file to determine that the administrative server VM shuts down correctly; shut down the node manager; and monitor the node manager log file to determine that the node manager shuts down correctly. In some embodiments, the system may start up the node manager; monitor the node manager log file to determine that the node manager starts up correctly; start up the administrative server VM using the node manager; and monitor the administrative server VM log file to determine that the administrative server VM starts up correctly. Furthermore, in some embodiments, the system may start up each managed server VM, for each of the one or more managed server VMs, and monitor managed server VM log files to determine that each managed server VM starts up correctly.

In some such embodiments of the system, the new parameters comprise at least a request for at least one new managed server VM. In other such embodiments of the system, the new parameters comprise: an input of at least a same application name as in the plurality of original parameters, and an input of a next sequential managed server number, as compared to an input of at least one managed server number as in the plurality of original parameters. Furthermore, in some such embodiments, the system may, in response to receiving the plurality of new parameters, check the plurality of ports to determine whether there are any port conflicts; determine whether the product binaries are currently installed; and define new functions based on the received plurality of new parameters.

In some embodiments of the system, the system may, in response to configuring the new cluster of managed server VMs in the domain, generate a unique and random password string that is specific to each managed server VM in the new cluster of managed server VMs; encrypt each of the unique and random passwords for each of the each managed server VM in the new cluster of managed server VMs; and store each of the encrypted passwords on their respective managed server VM in the new cluster of managed server VMs.

In some embodiments, the system may, in response to monitoring the managed server VM log files to determine that each managed server VM starts up correctly, connect each managed server VM to the node manager.

In some embodiments, the system may, in response to monitoring the managed server VM log files to determine that each managed server VM shut down correctly, start up a program to be executed on the managed server VMs, based on the received plurality of new parameters; monitor the managed server VM log files to determine that the program starts up correctly; shut down the program to be executed on the managed server VMs; and monitor the managed server VM log files to determine that the program shuts down correctly.

Finally, in some embodiments of the invention, the system may provide a report that the new cluster of managed server VMs in the domain are prepared for deployment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
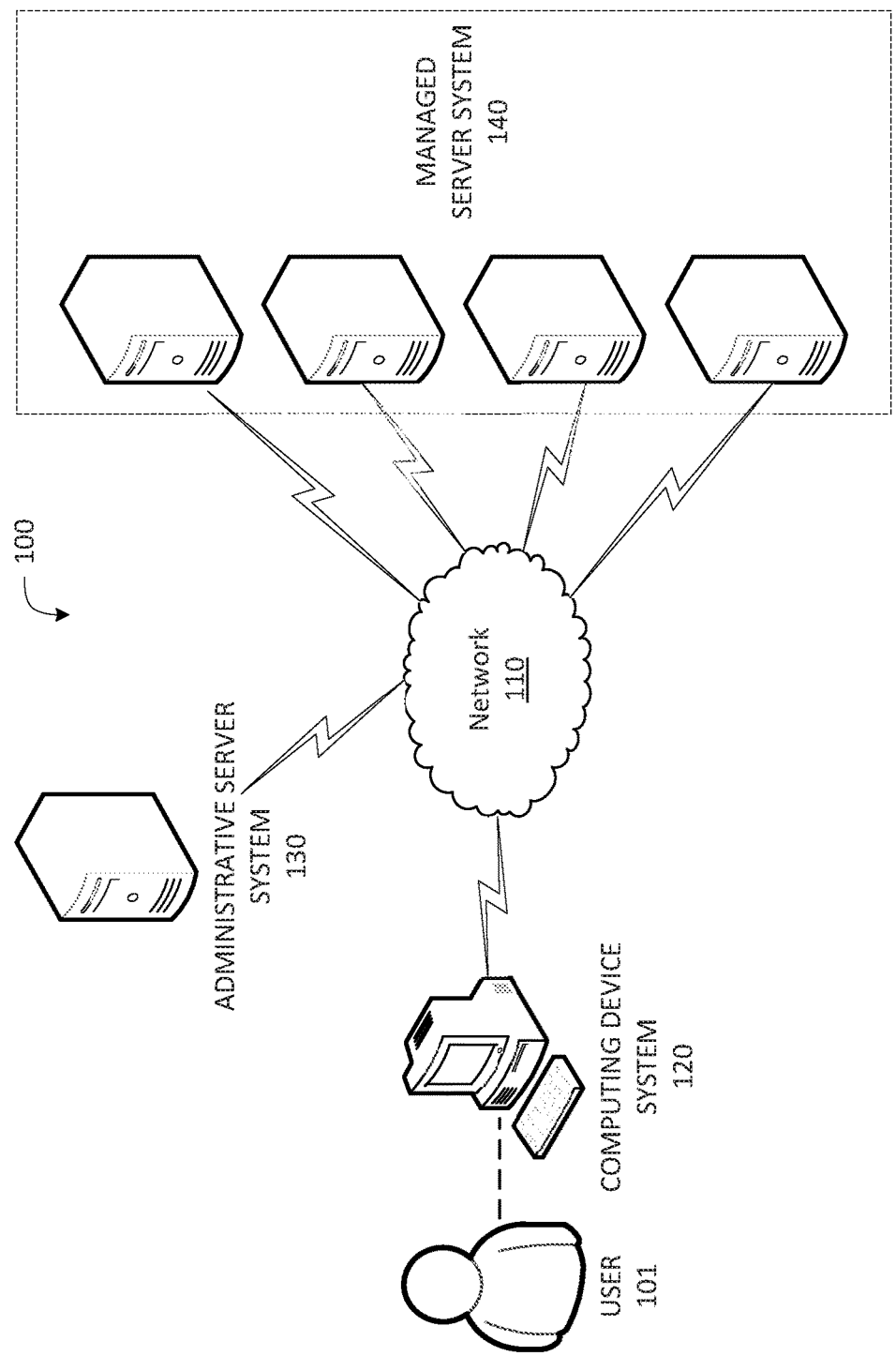
Figure 2C:
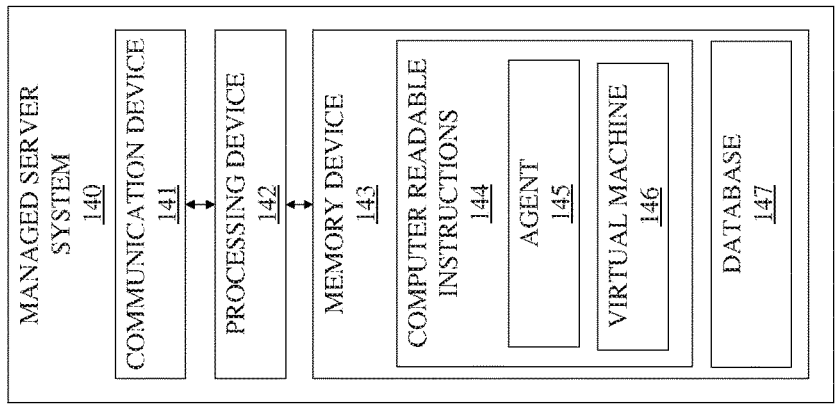
Figure 2B:
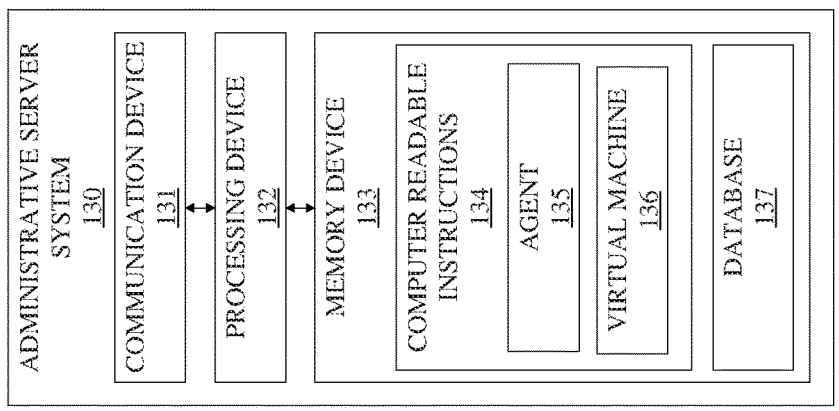
Figure 2A:
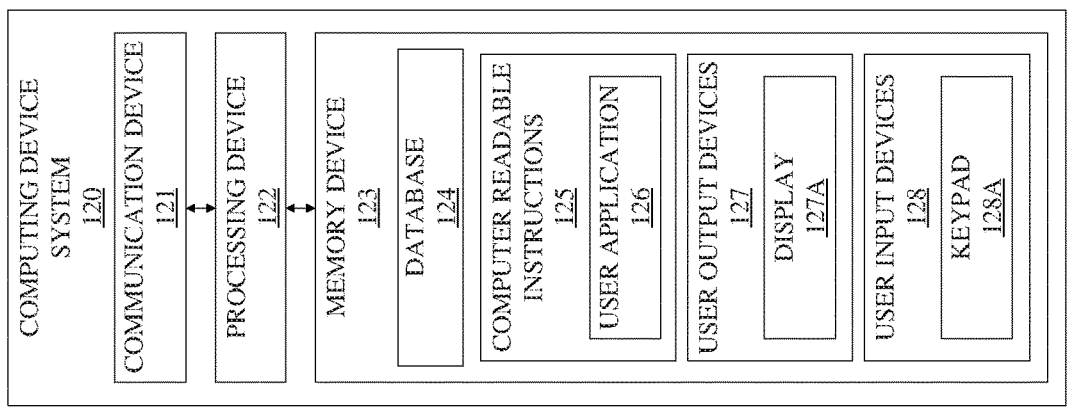
Figure 3A:
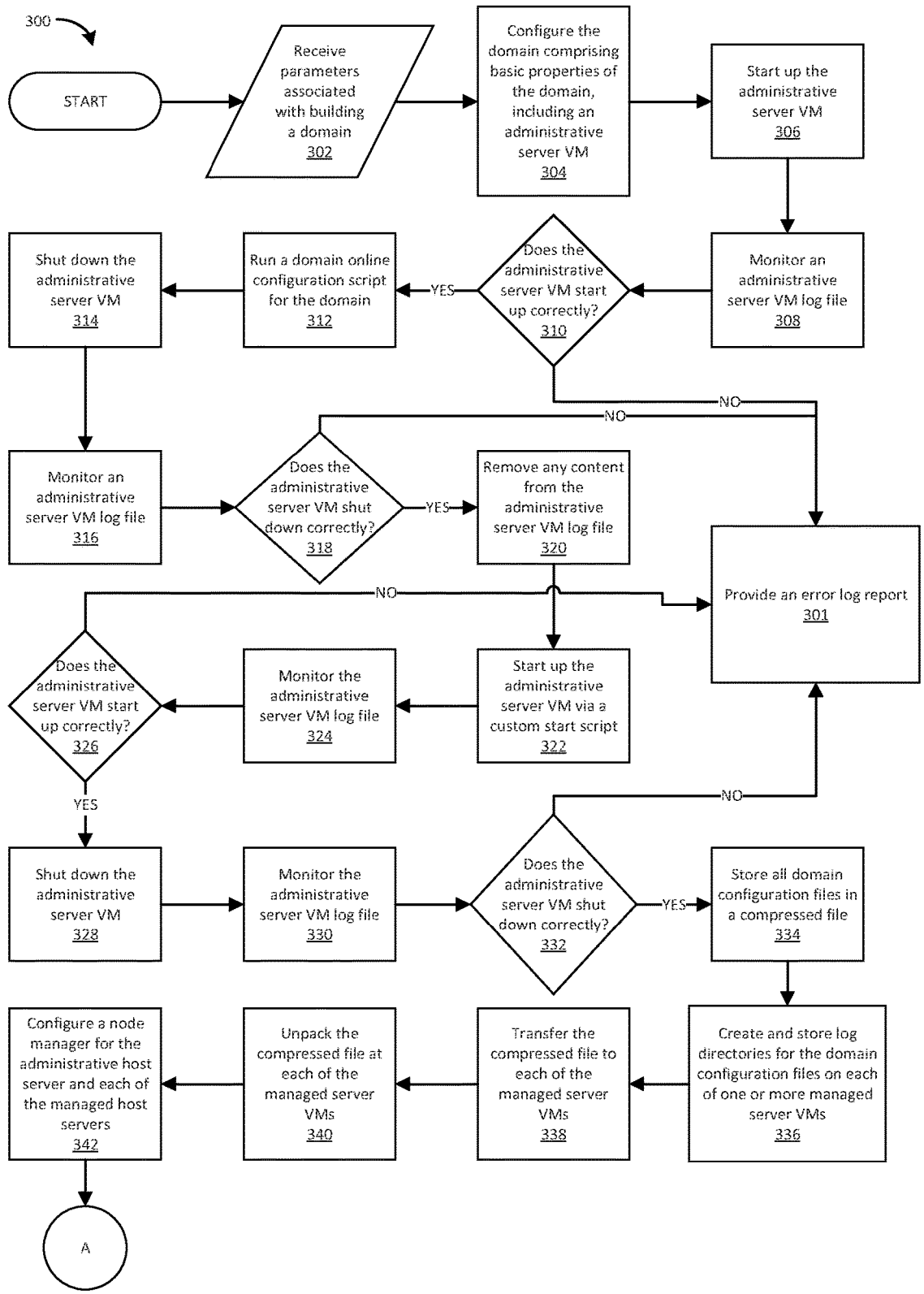
Figure 3B:
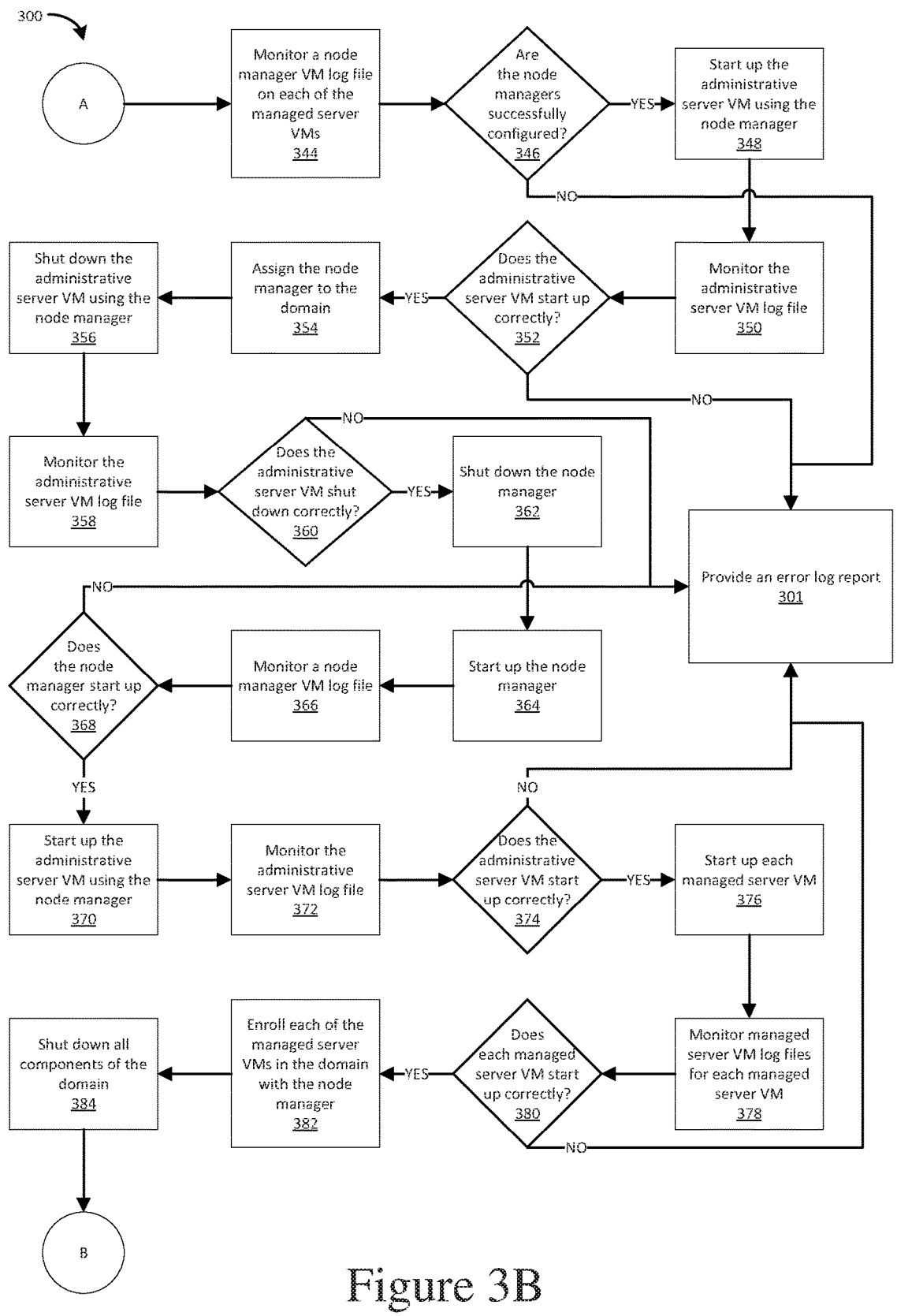
Figure 3C:
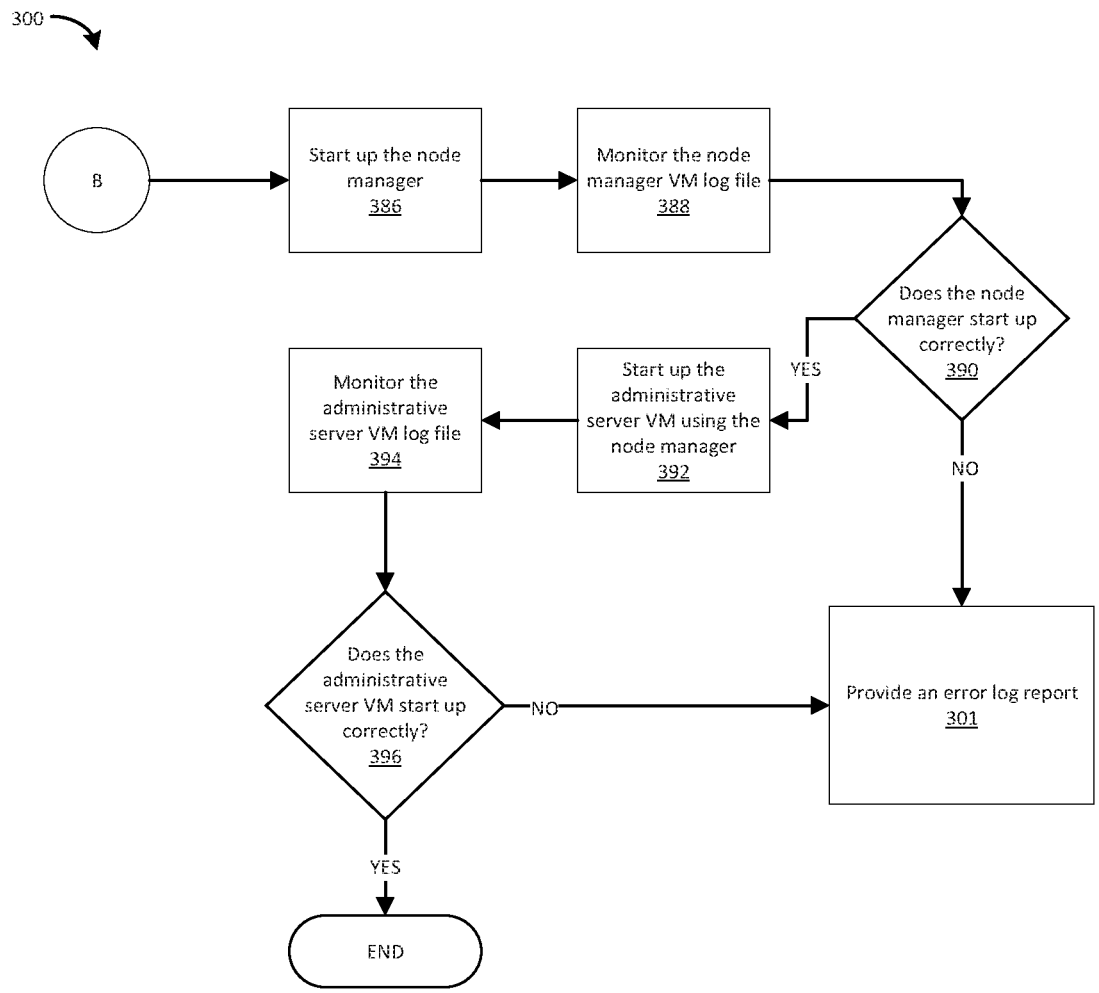
Figure 4A:
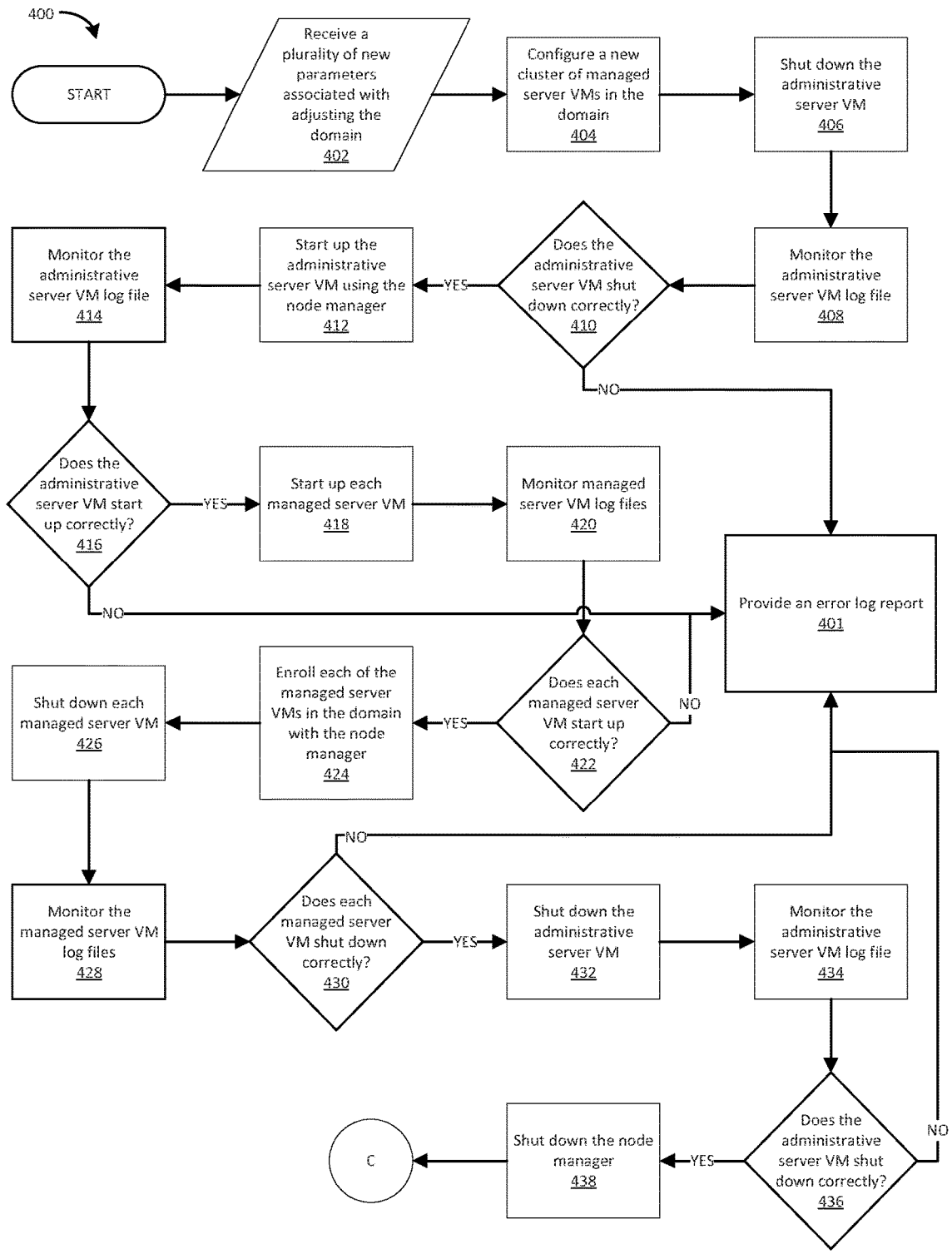
Figure 4B:
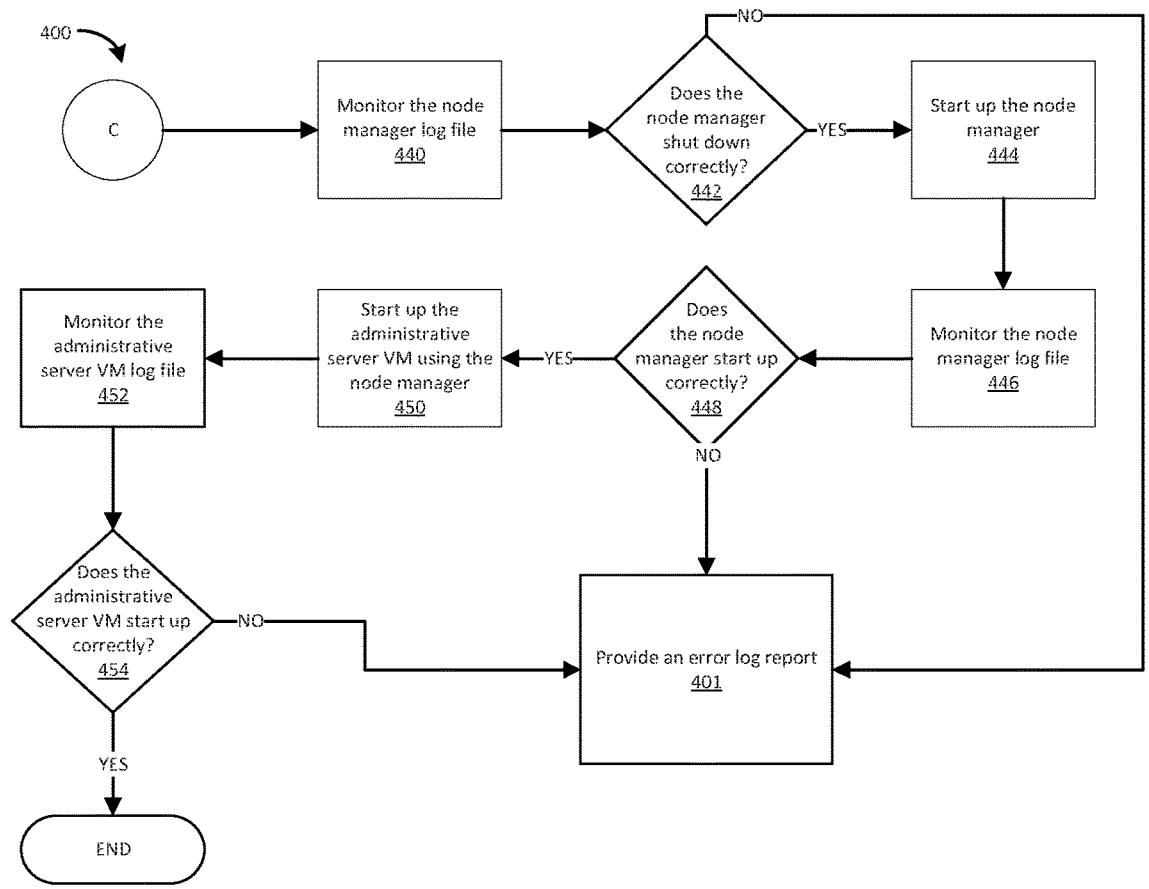

Having thus described embodiments of the invention in general terms, reference will now be made the accompanying drawings, wherein:

FIG. 1 provides a block diagram illustrating a system environment for deploying a server system, whereby the system communicates requests to host servers for the purpose of executing instructions on the host servers, in accordance with an embodiment of the invention;

FIG. 2A provides a block diagram illustrating the computing device system of FIG. 1, in accordance with an embodiment of the invention;

FIG. 2B provides a block diagram illustrating the administrative server system of FIG. 1, in accordance with an embodiment of the invention;

FIG. 2C provides a block diagram illustrating the managed server system of FIG. 1, in accordance with an embodiment of the invention;

FIGS. 3A, 3B, and 3C provide a process flow chart illustrating a system for building out and testing a domain, in accordance with an embodiment of the invention; and FIGS. 4A and 4B provide a process flow chart illustrating a system for building out and testing a reconstructed domain, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for deploying a server system, whereby the system communicates requests to host servers for the purpose of executing instructions on the host servers. The described invention is configured to ensure that any proposed use case is tested against security requirements, line of business requirements, and other requirements of a large entity that manages many different types of applications, multiple program versions, and different server configurations. Generally, the invention is designed to provide a guaranteed and consistent installation outcome for web application server software that aligns to security baselines and security standards along with being versatile enough to capture the line of business use cases of interest to each sector of an entity that shares a server network.

Embodiments of the present invention provide a system for building out and testing a wide range of server systems configured to meet varied use cases across a large enterprise. The systems described herein provide automated solutions for building out a domain that is specific to a user's use case needs, across multiple product versions, and within a large enterprise environment comprising rigorous security protocols. Generally, the system automates certain domain creation functions, automatically shuts down, starts up, and monitors functions as they occur in the domain to identify any potential errors. Additionally, techniques are described to build out and test adjustments to currently-existing domains in the same manner.

The invention can install and configure web application server software on a single host server or can span across an unlimited number of host servers, depending on the desired use case. Additionally, one or more remote managed host servers may be utilized, where the remote managed host servers are physically located in a different geographical location than an administrative host server and/or one or more other managed host servers. Therefore, the invention described herein is capable of transmitting and receiving command signals between servers to perform the functions described herein. In particular, method instructions (e.g., computer-readable program code) can be sent to agents that are installed on remote servers.

The invention described herein can be completed in a fully automated way, such that a user may input desired parameters (based on an expected or potential use case), and walk away from the process to let the automated features of the invention run through the automated steps described herein. In some embodiments, if a domain build is not successful, the reason for the failure will be displayed to the user in an error log report. In some embodiments, the system will provide a report to the user when the system successfully accomplishes the domain build without identifying any potential issues. Once a user receives a report of the successful domain build, the user can have confidence that the system is ready for installation in the server network of the managing entity.

As information and data security can be very important for some entities, particularly large entities like financial institutions, baseline and/or targeted security protocols can be automatically incorporated within the system, such that any domain being built through this system is tested against the strict security standards to which the managing entity is required to adhere.

FIG. 1 illustrates an embodiment of a system 100 for deploying a server system, whereby the system communicates requests to host servers for the purpose of executing instructions on the host servers. As illustrated, the system 100 may include a network 110 electronically connected to a computing device system 120, an administrative server system 130, and a managed server system 140. A user 101 may be associated with the computing device system 120 such that the user 101 may interact with the computing device system 120 via a user interface of the computing device system 120.

The managed server system 140 may comprise a single managed server or multiple managed servers in electronic communication with each other and/or the network 110. In some embodiments, one or more of the managed servers in the managed server system 140 may be remote managed servers, i.e., they are physically remote from the administrative server system 130 and/or one or more of the other managed servers in the managed server system 140. Each managed server within the managed server system 140 may be a distinct server from the other managed servers in the managed server system 140.

The network 110 may include a local area network (LAN), a wide area network (WAN), and/or a global area network (GAN). The network 110 may provide for wireline, wireless, or a combination of wireline and wireless communication between devices in the network. In one embodiment, the network 110 includes the Internet. In one embodiment, the network 110 includes an intranet of an entity (e.g., a managing entity).

Generally, the system environment 100 illustrated in FIG. 1 allows the computing device system 120 to receive certain inputs from the user 101 (e.g., original parameters for building out a domain, new parameters for appending additional managed servers to the domain, and/or new parameters for adding a new cluster of new managed servers to an existing domain), communicate these inputs to the administrative server system 130, facilitate an automated process for building out at least a component of a domain through communication with one or more remote managed servers in a managed server system 140, and provide reports to the user based on an outcome of the automated process.

FIG. 2A provides a block diagram illustrating the computing device system 120 of FIG. 1 in greater detail, in accordance with embodiments of the invention. As illustrated in FIG. 2A, the computing device system 120 involves one or more processing devices 122 operatively coupled to a communication device 121 and one or more memory devices 123. In some embodiments, the communication device 121 comprises a network communication interface. In certain embodiments, the computing device system 120 is operated by a specific entity, such as a managing entity.

The memory device 123 of the computing device system 120 may comprise a database 124, computer readable instructions 125 that house at least one user application 126, one or more user output devices 127 such as a display 127A, and one or more user input devices 128 such as a keypad 128A. In some embodiments, and as illustrated in FIG. 2A, the database 124 is located within the computing device system 120. However, it should be known that, in some embodiments, the database 124 may be housed remotely from the computing device system 120 and the user 101 or other components of the system environment 100 of FIG. 1 may be able to access the database 124 may be in communication with the database 124 across the network 110 and/or across some other communication link.

FIG. 2B provides a block diagram illustrating the administrative server system 130 of FIG. 1 in greater detail, in accordance with embodiments of the invention. As illustrated in FIG. 2B, the administrative server system 130 involves one or more processing devices 132 operatively coupled to a communication device 131 and one or more memory devices 133. In some embodiments, the communication device 131 comprises a network communication interface. In certain embodiments, the administrative server system 130 is operated by a specific entity, such as a managing entity.

The memory device 133 of the administrative server system 130 may comprise computer readable instructions 134 configured to support an agent 135 running on the administrative server system 130 and/or a virtual machine 136 of the administrative server system 130, and a database 137. In some embodiments, the agent 135 is configured to perform directory checks (e.g., determine whether one or more files are found in database (e.g., the database 137); transmit instructions to the managed server system 140 (e.g., sending instructions to the agent 145 of the managed server system 140) and/or the computing device system 120; receive instructions from the computing device system 120 and/or the managed server system 140; check entropy levels within a domain, the administrative server system 130 and/or the managed server system 140; and perform any other functions necessary to automate the process of building out and testing a new domain, appending additional managed servers to the domain, and/or adding a new cluster of managed servers to the domain.

The virtual machine 136 of the administrative server system 130 may comprise any type of virtual computing machine or emulation of a computer system. The virtual machine 136 may be based on a computer architecture that provides particular functionality to the administrative server system 130. This particular functionality may be created, adjusted, terminated, or otherwise manipulated based on input from the user 101. In this way, a user (or the system) may adjust the virtual machine 136 to adjust possible configurations of a real machine in a simplified manner.

In some embodiments, the virtual machine 136 of the administrative server system 130 may enable a computer to run a Java, thereby making the virtual machine 136 a Java virtual machine (JVM). As such, in some embodiments, the virtual machine 136 of the administrative server system 130 may be considered an administrative JVM, an administrative server JVM, an administrative host server JVM, and the like.

FIG. 2C provides a block diagram illustrating the managed server system 140 of FIG. 1 in greater detail, in accordance with embodiments of the invention. As illustrated in FIG. 2C, the managed server system 140 involves one or more processing devices 142 operatively coupled to a communication device 141 and one or more memory devices 143. In some embodiments, the communication device 141 comprises a network communication interface. In certain embodiments, the managed server system 140 is operated by a specific entity, such as a managing entity.

The memory device 143 of the managed server system 140 may comprise computer readable instructions 144 configured to support an agent 145 running on the managed server system 140 and/or a virtual machine 146 of the managed server system 140, and a database 147. In some embodiments, the agent 145 is configured to perform directory checks (e.g., determine whether one or more files are found in database (e.g., the database 147); transmit instructions to the administrative server system 130 (e.g., sending instructions to the agent 135 of the administrative server system 130) and/or the computing device system 120; receive instructions from the computing device system 120 and/or the administrative server system 130; check entropy levels within a domain, the managed server system 140 and/or the administrative server system 130; start and/or stop one or more programs; monitor one or more log files; and perform any other functions necessary to automate the process of building out and testing a new domain, appending additional managed servers to the domain, and/or adding a new cluster of managed servers to the domain.

The virtual machine 146 of the managed server system 140 may comprise any type of virtual computing machine or emulation of a computer system. The virtual machine 146 may be based on a computer architecture that provides particular functionality to the managed server system 140. This particular functionality may be created, adjusted, terminated, or otherwise manipulated based on input from the user 101. In this way, a user (or the system) may adjust the virtual machine 146 to adjust possible configurations of a real machine in a simplified manner.

In some embodiments, the virtual machine 146 of the managed server system 140 may enable a computer to run a Java, thereby making the virtual machine 146 a Java virtual machine (JVM). As such, in some embodiments, the virtual machine 146 of the managed server system 140 may be considered a managed JVM, a managed server JVM, a managed host server JVM, and the like. Of course, as the managed server system 140 may comprise multiple managed servers (e.g., remote servers), multiple virtual machines 146 may be associated with the managed server system 140, one (or more) for each managed server within the managed server system 140.

Referring to FIGS. 2A, 2B, and 2C collectively, the term "processor" and "processing device," as used herein, are terms that are intended to be used interchangeably herein and features and functionality assigned to a processor or processing device of one embodiment are intended to be applicable to or utilized with all or a portion of any other embodiment, unless stated otherwise. As used with respect to the computing device system 120, the administrative server system 130, and the managed server system 140, a "communication device" 121, 131, and 141 may generally include a modem, server, transceiver, and/or other device for communicating with other devices on a network (e.g., the network 110).

A "processing device" 122, 132, and 142 may generally refer to a device or combination of devices having circuitry used for implementing the communication and/or logic functions of a particular system. For example, a processing device 122, 132, and 142 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more programs based on computer-executable program code thereof, which may be stored in a memory device 123, 133, and 143.

As the phrase is used herein, a processing device may be "configured to" perform a certain function in a variety of ways, including, for example, particular computer-executable program code embodied in computer-readable medium, and/or by having one or more application-specific circuits perform the function. The processing device 122, 132, or 142 may be configured to use the communication device 121, 131, or 141, respectively, to transmit and/or receive data and/or commands to and/or from other devices within the network 110.

A "memory device" 123, 133, and 143 may generally refer to a device or combination of devices that store one or more forms of computer-readable media for storing data and/or computer-executable program code/instructions. For example, in one embodiment, the memory device 123, 133, and 143 may include any computer memory that provides an actual or virtual space to temporarily or permanently store data and/or commands provided to the processing device 122, 132, and 142 when it carries out its functions described herein.

Additionally, in some embodiments, the memory device 123, 133, and 143 includes a database 124, 137, and 147 or other data storage configured for storing information and/or data (e.g., log files, error reports, time-based information regarding one or more operations of its associated system, and the like). In other embodiments, the database 124, 137, and 147, may be housed remotely from the computing device system 120, the administrative server system 130, and/or the managed server system 140, and the computing device system 120, the administrative server system 130, and the managed server system 140 are in communication with the database 124, 137, and/or 144 across the network 110 and/or across some other communication link.

In one embodiment, the memory device 123 of the computing device system 120 includes computer readable instructions 125 that include a user application 126. In some embodiments, the memory device 123 of the computing device system 120 may include one or more user output devices 127. The user output devices 127 may include a display 127A (e.g., a liquid crystal display or the like), a speaker, another audio device, and the like, which are operatively coupled to the processing device 122. Furthermore, in some embodiments, the memory device 123 of the computing device system 120 may include one or more user input devices 128, which allow the computing device system 120 to receive data or other input from the user 101. The user input devices 128 may comprise or include a keypad 128A, a keyboard, a touch-screen, a touchpad, a microphone, a mouse, a joystick, another pointer device, a button, a soft key, and/or any other input device(s).

The user application 126 of the computing device system 120 may be configured to cause the user output devices 127 to display a request for input (e.g., parameters for building out a domain, and the like). Furthermore, the user application 126 may be configured to receive the input via the user input devices 128. The user application may also be configured to transmit computer readable instructions to the administrative server system 130 and/or the managed server system 140 via the communication device 121 of the computing device system 120.

Turning now to FIGS. 3A, 3B, and 3C, a process flowchart is provided to illustrate one embodiment of an application server deployment system 300, whereby the system 300 communicates requests to host servers for the purpose of executing instructions on the host servers. Some or all of the steps provided herein may be conducted automatically (e.g., as soon as one step is completed, the next step is conducted in response to the previous step's success).

The system may begin with block 302 by receiving parameters associated with building out a domain. In some embodiments, these received parameters may be considered "original parameters." These parameters may be received from a user associated with the system 300, and the parameters may set forth one or more requirements of the domain that is to be built out. For example, the parameters may stipulate a number of managed server VMs to build out, the log level, a development kit (e.g., Java development kit or "JDK") version, an application server version (e.g., a version of a WebLogic server), a runtime user, a runtime group, one or more datacenters (e.g., a name, network address, physical location, and the like of the one or more datacenters), an environment name (e.g., development, quality assurance (QA) environment, production environment, testing environment, and the like), an administrative host name, an administrative port number or name, a managed host name, a domain name, a new application short name, a next VM number, a cluster name, a port name or number increment, database requirements (e.g., log information parameters like number of logs, duration of logs, size of logs maintained, location of logs, and the like), names of hosts that are to be ignored, a cluster name, an environment name, staging directory name(s), whether or not a node manager is to be user, and/or the like.

In some embodiments, the system 300 includes one or more preset, automatic, preconfigured, or otherwise non-changeable parameters for building out the domain. For example, one or more specific security protocols may be in place for every attempt to build out a domain using the system 300 provided herein. In this way, the system 300 may always provide valuable information regarding how the new domain, its components, and any programs that are to be executed in the new domain will interact with the security provisions that are already in place. Of course, in some embodiments, a user may input additional or different security parameters as part of the received parameters, thereby allowing the system to monitor how the domain and its components would deal with the adjusted security provisions.

While not shown in FIG. 3A, the system 300 may conduct one or more additional steps between blocks 302 and 304. As such, the system 300 may check one or more managed hosts for a keystore. For example, a large organization or other managing entity may require transport layer security (TLS) TLS and/or secure sockets layer (SSL) certificates for all of their business applications. This step would help the organization verify that there is an SSL certificate available prior to building out the domain. If, however, the keystore is not found, then the system 300 may proceed directly to block 301, where the system provides an error log report and exits the automated process. Furthermore, this automated step of checking for a keystore uses an agent based solution, where an agent is installed on all hosts during an operating system (OS) build. The target agent receives instructions, from the agent running on the administrative host named in the received parameters to perform its task of checking for the keystore. The target agent may then send back information to the agent on the administrative host (e.g., "the keystore is found"/True, or "the keystore is not found"/False). Then the agent on the administrative host will proceed to the next step (e.g., if true) or proceed to block 301 (e.g., if false).

Next, the system 300 may check a plurality of ports to determine whether there are any port conflicts. In some embodiments of the invention, when communicating over a network, each application that is executed on a server has a port associated with the application. Communication directed to a given port is forwarded to the application associated with the port. In some instances, servers will have reserved ports for standard applications already running on the server. For example, a server may reserve port number A for a secure shell (SSH) application. Because some ports may be reserved, it is necessary in setting up the domain to determine what ports have been reserved for other applications. The agent system could be configured to send a request to the administrative server and the managed servers to execute a script stored on the system to determine which ports the individual servers have reserved and which ports are available. In other embodiments, the agent system could send requests to each port of the administrative server and the managed servers to determine whether the port is in use or available.

In some embodiment, an entity server is configured to host multiple domains. In such a case, ports are calculated for each component within the domain based on an initial starting point. The initial starting point is determined by a project acronym (external, internal) and the name of the environment being built (production, integration testing). To prevent port conflicts between the multiple domains, a physical host can only host a domain once for each project acronym and environment. As an example a single host cannot host two production domains for a project made available externally, however a development environment domain and an integration testing environment domain for a project made externally can reside on a single host. The code that builds the domain calculates the ports for each domain such that ports for a single domain are grouped in a range. Each range of ports associated with a given domain includes a base port from which the remaining ranges of ports for the given domain are calculated. In some embodiments, the base port for a project acronym and domain is communicated to the build job by a user. The user may communicate the base port as part of spreadsheet wherein the spreadsheet determines the base port based in part on a given project acronym and environment name.

Furthermore, and again, while not shown in FIG. 3A, the system 300 may additionally check a system level entropy to determine whether the entropy level of the system is appropriate to continue to the next step, or whether the entropy level of the system is not appropriate and therefore the next step should be block 301 to provide an error log report based on the failed system entropy level test. In particular, the agent running on the administrative host checks for a minimum required amount of entropy. If the minimum is not met, then the agent will either generate additional entropy or move the process along to block 301.

Another possible step before block 304 is to check to see if the domain name or location provided by the received parameters already exists. If so, then the system 300 can proceed to block 301 to provide an error log report on the existence of the domain before shutting down the automated session. Again, this step can be conducted by the agent on the administrative server.

Continuing with the set of possible steps before block 304, the system may make a determination as to whether product binaries are currently installed for the one or more components of the domain. Again, if the product binaries are not found, the system 300 may provide an error log report in block 301 and shut down the automated process.

Another possible step before block 304 is to define functions based on the received parameters. In such embodiments, the agent running on the administrative server is given instructions to execute the automation of defining and creating one or more functions that will eventually be executed on the new domain to build out the domain to some extent. For example, one or more of the functions defined here can be used in block 312, as described later.

Moving on, in some embodiments, the system 300 may execute the steps of block 304, where the system 300 configures the domain based at least in part on the received plurality of parameters, wherein creating the domain comprises creating just the basic properties of the domain, including an administrative server virtual machine (VM). In some embodiments, the virtual machine is a Java virtual machine, so this may create an administrative server JVM in such embodiments. However, for simplicity's sake, and different types of virtual machine may be used, we will refer to this virtual machine as the administrative server VM. To configure the domain, the agent running on the administrative host server is given instructions to execute the automation that creates the basic properties of the domain.

While not shown in FIG. 3A, the system 300 at this point may perform one or more security functions to further protect the domain. For example, the system 300 may generate a unique and random password string that is specific to the domain, encrypt the unique and random password string, and store the encrypted password for later reference.

At block 306, the system 300 may start up the administrative server VM. In such embodiments, the agent running on the administrative host server is given instructions to start up the newly created administrative server VM. Furthermore, in some embodiments, the newly generated encrypted password may be encrypted at this first startup of the administrative server VM.

Next, at block 308, the system 300 may monitor an administrative server VM log file and, at block 310, determine whether the administrative server VM starts up correctly. Here, the agent running on the administrative host server is given instructions to monitor the administrative server VM log file for certain conditions that would indicate a successful startup. If the administrative server VM does not star up successfully, then the agent is given instructions to provide an error log of the incident under block 301 and to exit the automated domain build.

If the system 300 determines that the administrative server VM does start up correctly, the system 300 may proceed to block 312, where the system 300 may run a domain online configuration script for the domain. In such embodiments, the agent running on the administrative host server is given instructions, after the successful administrative server VM startup, to execute an additional domain configuration that requires this administrative server VM to be running. This additional configuration includes, but not limited to, configuring the domain to use the managing entity's lightweight directory access protocol (LDAP) system for administrative console authorization, configuring internal global information security (GIS) requirements regarding TLS versions to be used, SSL settings to be applied for all business logic applications running within a virtual machine, and the like.

Once the domain online configuration has taken place, the system 300 may proceed to block 314, where the system shuts down the administrative server VM. In such embodiments, the agent running on the administrative host server is given instructions to shut down the administrative server VM, in response to the completion of block 312.

Once the administrative server VM has been shut down, the system 300 may proceed to block 316, where the system monitors an administrative server VM log file to determine, as shown in block 318, whether the administrative serve VM shut down correctly. In such embodiments, the agent running on the administrative host server is given instructions to monitor the administrative server VM log file for a successful administrative server VM shut down. If the administrative server VM does not shut down successfully, as indicated by the administrative server VM log file, then the system 300 may proceed to block 301 to provide an error log report based on the failed shut down and terminate the automated process for building out the domain.

However, if the system 300 determines that the administrative server VM does shut down correctly, the system 300 may proceed on to block 320, where the system 300 removes any content from the administrative server VM log file. In general, the system 300 is cleaning up the administrative server logs. As such, the agent running on the administrative host server is given instructions to remove all existing content from the administrative server VM log files.

After the administrative server VM log files have been cleared, the system 300 can check to see whether the administrative server VM can start up without problems. Therefore, the system 300 may proceed to block 322, where the system starts the administrative server VM via a custom start script. The agent running on the administrative host server is given instructions to start up the administrative server VM using the customer start script, and the administrative server VM begins to start up.

Next, the system 300 will monitor the administrative server VM log files in block 324 to determine, as shown in block 326, whether the administrative server VM does indeed start up correctly. If the administrative server VM does not start up correctly, then the system 300 progresses to block 301, where an error log report is provided indicating that there is an issue with the administrative server VM on startup, and the system 300 may then end the automated process of building out the domain. To accomplish the task of monitoring the administrative server VM, the agent running on the administrative host server is given instructions to monitor the administrative server VM log file for certain conditions that indicate a successful startup.

If the system 300 determines that the administrative server VM does in fact start up correctly, the system 300 may proceed to block 328, where the system 300 shuts down the administrative server VM. As such, the agent running on the administrative host server is given instructions to shut down the administrative server VM after the above-additional security configurations have been applied.

Next, the system 300 proceeds to block 330, where the system monitors the administrative server VM log file to determine, as stated in block 332, whether the administrative server VM shut down correctly. In such embodiments, the agent running on the administrative host server is given instructions to monitor the administrative server VM log file for a successful administrative server VM shut down. If the administrative server VM does not shut down successfully, then agent is given instructions to proceed to block 301 to provide an error log report regarding the failed shut down of the administrative server VM, and to exit the automated process of the domain build.

Moving on, the system 300 may proceed to block 334, where the system stores all domain configuration files in a compressed file. In such embodiments, the agent running on the administrative host server is given instructions to execute a utility that will gather all of the domain configuration files and place them into a compressed file. This can be considered "packing the domain." In some embodiments, the compressed file is stored as a Java Archive file (the jar file format).

Once the compressed file is created, the system 300 may proceed to block 336, where the system 300 creates and stores log directories for the domain configuration files on each of the one or more managed server VMs. The system is now reaching out to the managed server virtual machines (managed server VMs) and, as mentioned above, it should be noted that one or more of the managed server VMs may be a remote server (e.g., remote from the administrative host server, remote from other managed servers, and the like). Here, the agent running on the administrative host server is given instructions to send instructions to the agents running on all of the managed host servers. The agents on the managed host servers receive the instructions to perform the automation to create the necessary log directories.

Once the log directories are created and stored, the system 300 may proceed to block 338, where the system transfers the compressed file to each of the managed server VMs. In such embodiments, the agent running on the administrative host server is given instructions to send the compressed file (e.g., a .jar file) to agents running on each one of all of the managed host servers. The agents on each of the managed host servers receive the instructions to copy the compressed file to the appropriate directory on their local system.

Next, the system may proceed to block 340, where the system unpacks the compressed file at each of the managed server VMs. As such, the agent running on the administrative host server is given instructions to send instructions to the agents running on all of the managed host servers. The agents on the managed host servers receive the instructions to perform the automation to unpack the compressed file (e.g., a .jar file) to the appropriate directory.

In some embodiments, after unpacking the compressed file at each of the managed server VMs, the system 300 may generate, encrypt, and store a password string (not shown) for each of the managed server VMs. As with the password for the administrative server VM, the system may first generate a unique and random password string that is specific to each of the managed server VMs, then encrypt each of the unique and random passwords for each of the managed server VMs, and finally store each of the encrypted passwords on their respective managed server VM. In some embodiments, the agent running on the administrative host server is given instructions to send instructions to the agents running on all of the managed host servers. Then, the agents on the managed host servers receive the instructions to perform the automation to generate, encrypt, and store a password string that is unique to each managed host server, and store their respective passwords in a local or accessible file.

Next, the system 300 may configure a node manager for the administrative host server and each of the managed host servers, as shown at block 342. In such embodiments, the agent running on the administrative host server is given instructions to send instructions to the agents running on all of the managed host servers. The agents on each of the managed host servers receive the instructions to create a properties file that is used by the product. The agents on the managed host servers apply the payload from the properties file that was created. The agents on the managed host servers receive the instructions to perform a startup of the node manager process.

Next, to determine whether the node managers were created successfully, the agents on each of the managed host servers receive the instructions to monitor a node manager VM log file for a successful startup, as show in block 344 of FIG. 3B. If the all of the agents on the managed host servers determine that the node managers are successfully configured (on each respective managed host server), then the system can progress to block 348. However, if at least one agent on one of the managed host servers determines that the node manager was not successfully configured, then the system 300 will proceed to block 301, where the system 300 will provide an error log report based on the failed configuration of the node manager before ending the automated process for building out the domain.

Moving to block 348, the system 300 is now ready to test the administrative server VM in conjunction with the node manager by starting up the administrative server VM using the node manager. As such, the agent running on the administrative host server is given instructions to startup the administrative server VM using the node manager.

Next, the system monitors the administrative server VM log file in block 350 to determine whether the administrative server VM log file starts up correctly. As such, the agent running on the administrative host server is given instructions to monitor the administrative server VM log file for certain conditions that indicate a successful startup. If the administrative server VM does not start up successfully, then the agent is given instructions to proceed to block 301 to provide an error log report of the failed administrative server VM startup before exiting the automated domain build process.

Once the administrative server VM is determined to have started up correctly or successfully, the system 300 may proceed to block 354 to assign the node manager to the domain. In such embodiments, the agent running on the administrative host server is given instructions to send instructions to the agents running on all of the managed host servers. The agents on the managed host servers receive the instructions to assign the node manager to the domain, and carry out these instructions on their respective servers.

Next, the system proceeds to block 356 to shut down the administrative server VM using the node manager. In such embodiments, the agent running on the administrative host server is given instructions to shut down the administrative server VM, and therefore carries out these instructions.

The system 300 may then monitor the administrative server VM log file as stated in block 358 to determine whether the administrative server VM shut down correctly or successfully, as stated in block 360. As such, the agent running on the administrative host server is given instructions to monitor the administrative server VM log file for a successful administrative server VM shut down. If the administrative server VM does not shut down successfully, then the agent is given instructions to proceed to block 301 to provide an error log report regarding the failed shut down of the administrative server VM before exiting the domain build automated process.

If the system 300 determines that the administrative server VM was shut down correctly, then the system 300 may proceed to block 362 to shut down the node manager. In such embodiments, the agent running on the administrative host server is given instructions to send instructions to the agents running on all of the managed host servers. The agents on the managed host servers then receive the instructions to shut down the node manager, and perform the task.

Once the node manager has been shut down, the system may start up the node manager at block 364 and monitor a node manager VM log file at block 366 to determine whether the node manager starts up correctly, as stated in block 368. To start up the node manager, the agent running on the administrative host server is given instructions to send instructions to the agents running on all of the managed host servers. The agents on the managed host servers receive the instructions to startup the node manager. To monitor the node manager VM log files, the agent running on the administrative host server is given instructions to send instructions to the agents running on all of the managed host servers. The agents on the managed host servers receive the instructions to monitor the node manager VM log file for certain conditions that indicate a successful startup. If the node manager VM does not startup successfully the agent is given instructions to proceed to block 301 to provide an error log report regarding the failed startup of the node manager before exiting the automated process for building the domain.

Next, the system may start up the administrative server VM using the node manager, as shown in block 370. In such embodiments, the agent running on the administrative host server is given instructions to startup the administrative server VM using the node manager.

The system 300 may then monitor the administrative server VM log file at block 372 to determine whether the administrative server VM starts up correctly, as posed in block 374. In some such embodiments, the agent running on the administrative host server is given instructions to monitor the administrative server VM log file for certain conditions that indicate a successful startup. If the administrative server VM does not startup successfully, then the agent is given instructions to proceed to block 301 to provide an error log report regarding the failed administrative server VM startup before exiting the domain build automated process.

Once the administrative server VM is determined to have started up successfully, the system 300 may proceed to block 376 to start up each managed server VM. To accomplish this task, the agent running on the administrative host server is given instructions to send instructions to the agents running on all of the managed host servers. The agents on the managed host servers receive the instructions to start up every managed server VM that has been created for the domain.

Next, the system monitors managed server VM log files for each of the managed server VMs, as shown in block 378, to determine whether each managed server VM starts up correctly, as noted in block 380. In such embodiments, the agent running on the administrative host server is given instructions to send instructions to the agents running on all of the managed host servers. The agents on the managed host servers receive the instructions to monitor the managed server VM log files for certain conditions that indicate a successful startup. If one or more of the managed server VMs do not startup successfully, then the agent is given instructions to proceed to block 301 to provide an error log report regarding the failed startup of the managed server VMs before exiting the automated process for building out the domain.

After a successful determination in block 380, in some embodiments, the system may perform the task of connecting to the node manager (not shown in FIG. 3B). In such embodiments, the system 300 proceeds to block 382 to enroll each of the managed server VMs in the domain with the node manager. Here, the agent running on the administrative host server is given instructions to send instructions to the agents running on all of the managed host servers. The agents on the managed host servers receive the instructions to connect to the node manager and enroll the managed server VMs in the domain.

In some embodiments, after completing step 382, the system may generate stop, start, and status jobs for one or more applications that are to be run in the domain, once it is built out. For example, the system 300 may start up a program to be executed on the managed server VMs, based on the received plurality of parameters. Next, the system 300 may monitor the managed server VM log files to determine whether the program starts up correctly, proceeding to block 301 if the program fails to start up correctly. If the startup is successful, the system may then shut down the program to be executed on the managed server VMs, and monitor the managed server VM log files to determine whether the program shuts down correctly, proceeding to block 301 if the program fails to shut down correctly. In some embodiments, these steps may be performed by the agent running on the administrative host server, wherein the agent running on the administrative host server is given instructions to generate a UNIX shell script and an associated python script. The python script contains the payload to perform the stop, start, status, and deploy functions. The UNIX shell script contains the logic to execute the python file. The agent running on the administrative host server is given instructions to send instructions to the agents running on all of the managed host servers. The agents on the managed host servers receive the instructions to copy the above-referenced scripts to each managed host server.

After block 382, and/or after testing the programs as described above, the system may proceed to block 384 and shut down all components of the domain. In such embodiments, the agent running on the administrative host server is given instructions to shut down the administrative server VM, every managed server VM and the node manager VM. The agent running on the administrative host server is then given instructions to send instructions to the agents running on all of the managed host servers. The agents on the managed host servers receive the instructions to shut down every managed server VM and the node manager VM.

Once every component of the domain is shut down, the system 300 may then proceed to block 386, where the system starts up the node manager. The agent running on the administrative host server is given instructions to send instructions to the agents running on all of the managed host servers. The agents on the managed host servers receive the instructions to startup the node manager.

Next, the system 300 can monitor the node managed VM log file, as referenced at block 388, to determine whether the node manager starts up correctly, as mentioned at block 390. Here, the agent running on the administrative host server is given instructions to send instructions to the agents running on all of the managed host servers. The agents on the managed host servers receive the instructions to monitor the node manager VM log file for certain conditions that indicate a successful startup. If the node manager does not startup successfully, then the agent is given instructions to proceed to block 301 to provide an error log report of the failed node manager startup before exiting the automated process to build out the domain.

Once the node manager is determined to have successfully started up, the system 300 can turn to block 392 to start up the administrative server VM using the node manager. Here, the agent running on the administrative host server is given instructions to startup the administrative server VM using the node manager.

Next, the system monitors the administrative server VM log file at block 394 to determine whether the administrative server VM starts up correctly, as noted in block 396. Again, the agent running on the administrative host server is given instructions to monitor the administrative server VM log file for certain conditions that indicate a successful startup. If the administrative server VM does not startup successfully the agent is given instructions to proceed to block 301 to provide an error log report regarding the failed administrative server VM startup before exiting the automated process to build out the domain.

In some embodiments, when the system 300 determines that the administrative server VM starts up correctly at block 396, the system may provide a report that the domain is prepared for deployment. This report, as well as the error log report of block 301, may be any type of report that can be presented to a user via a computing device user interface (e.g., a display). In some embodiments, no final report is provided. In some embodiments, the lack of a final report is an indication that the domain was successfully built out and tested.

Referring now to FIGS. 4A and 4B, a process flowchart is provided to illustrate one embodiment of an application server deployment system 400, whereby the system 400 communicates requests to host servers for the purpose of executing instructions on the host servers. In particular, the system 400 is provided to enable a user to append additional managed servers to an existing domain or to add a new cluster with new managed servers for a new application being deployed to an existing domain. The distinction between these two possible functions of the system 400 are determined in the received new parameters (block 402) of the system. For example, to append additional managed servers to an existing domain, a user may provide input that includes the same application name(s) as are already present in the existing domain, and provide a next sequential managed server number that an administrator would expect to see (thereby laying the groundwork for expanding the number of managed servers in the existing domain). Alternatively, to add a new cluster with new managed servers for a new application, the user may input new parameters that include a request for at least one new managed server VM (thereby laying the groundwork for creating a new cluster).

As with the system 300, some or all of the steps provided herein with regard to the system 400 may be conducted automatically (e.g., as soon as one step is completed, the next step is conducted in response to the previous step's success).

Turning now to FIG. 4A, the system 400 may begin at block 402 by receiving (e.g., from a computing device associated with a user) a plurality of new parameters associated with adjusting an existing domain. While the term "new parameters" is used in reference to block 402, it should be known that at least one parameter is new or different than a parameter received in block 302 of system 300, but one or more other parameters received at block 402 may be the same (or must be the same) as the parameters received in block 302. Generally, the same types of parameters may be input by a user as in block 302. The system 400 of FIGS. 4A and 4B are generally implemented either after the system 300 is completed, or after a domain has been built out in some other method.

As with system 300, there are some additional, alternative, or extra steps that the system 400 may execute as part of the automated process that are not expressly listed in FIG. 4A or 4B. For example, after receiving the plurality of new parameters, the system 400 may check a plurality of ports to determine whether there are any port conflicts. Additionally or alternatively, the system 400 may determine whether product binaries are currently installed. Furthermore, the system 400 may define functions based on the received new parameters. Each of these processes may be conducted in substantially the same way as described with respect to system 300. In some embodiments, one or more of these processes are optional. In some embodiments, one or more of these processes are required. In some embodiments, one or more of these processes are not necessary as they have already been cleared by the system 300 executing the process beforehand.

Moving on, in some embodiments, the system 400 may include block 404, where the system configures a new cluster of managed server VMs in the domain. Of course, this step may be relevant only to embodiments where a new cluster is requested. As such, a user may input "yes" or "true" when prompted to input a request for an additional cluster. Alternatively, if a user does not wish to add a new cluster (e.g., the user wishes to append additional managed servers to the domain without adding a new cluster), then the user may input "no," "false," or "none" in response to the prompted request for an additional cluster. When a new cluster is created, the agent running on the administrative host server is given instructions to execute the automation. During this step the basic properties of the domain are created.

In some embodiments, the next step for the system 400 is to generate a unique and random password string that is specific to each managed server VM in the new cluster of managed server VMs, encrypt each of the unique and random passwords for each of the each managed server VM in the new cluster of managed server VMs, and store each of the encrypted passwords on their respective managed server VM in the new cluster of managed server VMs.

In block 406, the system 400 may shut down the administrative server VM. In such embodiments, the agent running on the administrative host server may be given instructions to shut down the administrative server VM after the above additional security configurations have been applied.

The system 400 may then monitor the administrative server VM log file in block 408 to determine whether the administrative server VM shuts down correctly, as noted in block 410. Here, the agent running on the administrative host server is given instructions to monitor the administrative server VM log file for a successful administrative server VM shut down. If the administrative server VM does not shut down successfully, the agent is given instructions to proceed to block 401, where the system 400 will provide an error log report before exiting the automated domain reconstruction process.

Once the system 400 determines that the administrative server VM shut down correctly, the system can start up the administrative server VM using the node manager 412. In such embodiments, the agent running on the administrative host server is given instructions to startup the administrative server VM using the node manager.

The system 400 may then monitor the administrative server VM log file at block 414 to determine whether the administrative server VM starts up correctly, as shown in block 416. To accomplish these steps, the agent running on the administrative host server is given instructions to monitor the administrative server VM log file for certain conditions that indicate a successful startup. If the administrative server VM does not startup successfully, the agent is given instructions to proceed to block 401 to provide an error log report regarding the failed startup of the administrative serer VM before exiting the automated process for reconstructing the domain.

Once the administrative server VM is determined to have successfully started up, the system 400 can proceed to block 418, where the system 400 starts up each managed server VM in the domain. To accomplish this task, the agent running on the administrative host server is given instructions to send instructions to the agents running on all of the managed host servers. The agents on the managed host servers receive these instructions to startup every managed server VM that has been created for the domain, and execute those instructions.

The system 400 may then proceed to block 420, where the system monitors the managed server VM log files to determine whether each managed server VM starts up correctly, as stated in block 422. Here, the agent running on the administrative host server is given instructions to send instructions to the agents running on all of the managed host servers. The agents on the managed host servers receive the instructions to monitor the managed server VM log files for certain conditions that indicate a successful startup. If one or more of the managed server VMs do not start up successfully, the agent is given instructions to proceed to block 401 to provide an error log report regarding the failed startup of the one or more managed server VMs before exiting the automated process for domain reconstruction.

Once each of the managed server VMs are determined to have started up successfully, the system 400 proceeds on to block 424, where the system 400 enrolls each of the managed server VMs in the domain with the node manager. Here, the agent running on the administrative host server is given instructions to send instructions to the agents running on all of the managed host servers. The agents on the managed host servers receive the instructions to connect to the node manager and enroll the domain managed server VMs, and therefore execute these instructions.

Next, the system 400 may proceed to block 426, where the system shuts down each managed server VM on every managed host server in the domain. To accomplish this task, the agent running on the administrative host server is given instructions to send instructions to the agents running on all of the managed host servers. The agents on the managed host servers receive the instructions to shut down all the managed server VMs.

The system 400 can then monitor the managed server VM log files, as stated in block 428 to determine whether each managed server VM shuts down correctly, as stated in block 430. Here, the agent running on the administrative host server is given instructions to send instructions to the agents running on all of the managed host servers. The agents on the managed host servers receive the instructions to monitor the managed server VM log files for certain conditions that indicate a successful shut down. If one or more of the managed server VMs do not shut down successfully, the agent is given instructions to proceed to block 401 to provide an error log report regarding the failed shut down of the managed server VMs before exiting the automated process for reconstructing the domain.

In some embodiments (not shown in FIG. 4A), the system 400 may generate stop, start, and status jobs for one or more programs that may be executed on the managed server VMs. In some embodiments, this process is conducted while the managed server VMs are up and running. As such, the system 400 may start up a program to be executed on the managed server VMs, based on the received plurality of parameters. Next, the system 400 may monitor the managed server VM log files to determine whether the program starts up correctly, proceeding to block 401 if the program does not start up correctly. Additionally, the system 400 may shut down the program to be executed on the managed server VMs, and monitor the managed server VM log files to determine whether the program shuts down correctly. If the program does not shut down correctly, the system 400 may proceed to block 401 to provide an error log report of the failure. These steps may be substantially similar to those mentioned above with respect to generating start, stop, and status jobs for potential programs in system 300.

Moving on to block 432, the system 400 may shut down the administrative server VM. In such embodiments, the agent running on the administrative host server is given instructions to shut down the administrative server VM, and executes these instructions.

The system 400 may then monitor the administrative server VM log file at block 434 to determine whether the administrative server VM shuts down correctly, as stated in block 436. Here, the agent running on the administrative host server is given instructions to monitor the administrative server VM log file for a successful administrative server VM shut down. If the administrative server VM does not shut down successfully, then the agent is given instructions to proceed to block 401 to provide an error log report regarding the failed shut down of the administrative server VM before exiting the automated process for reconstructing the domain.

Once the administrative server VM is determined to have been shut down correctly, the system 400 may shut down the node manager, as stated in block 438. To accomplish this task, the agent running on the administrative host server is given instructions to send instructions to the agents running on all of the managed host servers. The agents on the managed host servers receive the instructions to shut down the node manager, and carry out these instructions to shut down the node manager.

Continuing to FIG. 4B, the system 400 may then monitor the node manager log file at block 440 to determine whether the node manager shut down correctly, as stated in block 442. Here, the agents on the managed host servers receive the instructions to monitor the node manager VM log file for certain conditions that indicate a successful shut down. If the node manager VM does not shut down successfully, the agent is given instructions to proceed to block 401 to provide an error log report before exiting the automated process to reconstruct the domain.

Once the system 400 determines that the node manager has shut down correctly, the system may start up the node manager at block 444. In such embodiments, the agent running on the administrative host server is given instructions to send instructions to the agents running on all of the managed host servers. The agents on the managed host servers receive the instructions to start up the node manager, and thereby carry out these instructions.

Next, the system 400 may monitor the node manager log file, as stated in block 446, to determine whether the node manager starts up correctly, as referenced in block 448. To accomplish this task, the agent running on the administrative host server is given instructions to send instructions to the agents running on all of the managed host servers. The agents on the managed host servers receive the instructions to monitor the node manager VM log file for certain conditions that indicate a successful startup. If the node manager VM does not startup successfully, then the agent is given instructions to proceed to block 401 to provide an error log report regarding the failed startup of the node manager before exiting the domain reconstruction automated process.

Once the node manager is determined to have been started up successfully, the system 400 may proceed to block 450, where the system starts up the administrative server VM using the node manager. Here, the agent running on the administrative host server is given instructions to startup the administrative server VM using the node manager and therefore does execute these instructions to start up the administrative server VM.

The system 400 may then monitor the administrative server VM log file at block 452 to determine whether the administrative server VM starts up correctly, as stated in block 454. To accomplish these tasks, the agent running on the administrative host server is given instructions to monitor the administrative server VM log file for certain conditions that indicate a successful startup. If the administrative server VM does not startup successfully, then the agent is given instructions to proceed to block 401 to provide an error log report before exiting the automated process to reconstruct the domain.

In some embodiments, the system 400 may additionally start up each managed server VM, and monitor each managed server VM log files to determine whether every managed server VM starts up successfully, providing an error log report if one or more managed server VMs fail to start up successfully. Here, the agent running on the administrative host server is given instructions to send instructions to the agents running on all of the managed host servers. The agents on the managed host servers receive the instructions to start up the managed server VMs and then to monitor the managed server VM log files for certain conditions that indicate a successful startup.

As with the system 300, the system 400 may additionally include a final step of providing a report that the reconstructed domain is prepared for deployment. However, in some embodiments, a lack of a report is an indication that the reconstructed domain is ready for deployment.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computing device system for deploying a server system, whereby the computing device system communicates user requests to a plurality of managed host servers for a purpose of executing instructions on the plurality of managed host servers, the computing device system comprising:

one or more storage devices with computer-readable program code store thereon;

a communication device;

one or more computer processing devices operatively coupled to said one or more storage device and said communication device, wherein said one or more computer processing devices are configured to execute the computer-readable program code stored on said storage device to cause the computing device system to perform steps of:

receive from the user, via said communication device, a plurality of original parameters comprising hardware, software, and network information associated with building a domain, wherein the domain is new;

in response to receiving the plurality of original parameters, search a keystore in each of the plurality of managed host servers for a transport layer security certificate and a secure sockets layer certificate;

in response to determining that the keystore found in the plurality of managed host servers does not include the transport layer security certificate or the secure sockets layer certificate, automatically transmit an error log report and end the execution of the one or more computer processing devices; or in response to determining that the keystore found in the plurality of managed host servers does include both the transport layer security certificate and the secure sockets layer certificate, do not transmit the error log report and do not terminate the execution of the one or more computer processing devices for building the domain;

configure the domain based on the received plurality of original parameters, wherein creating the domain comprises basic properties of the domain, including an administrative server virtual machine (VM) associated with an administrative host server;

start the administrative server VM;

monitor an administrative server VM log the to determine that the administrative server VM starts up correctly;

run a domain online configuration script;

shut down the administrative server VM;

monitor the administrative server VM log file to determine that the administrative server VM shut down correctly;

remove any content from the administrative server VM log file;

start up the administrative server VM via a custom start script;

monitor the administrative server VM log file to determine that the administrative server VM starts up correctly;

shut down the administrative server VM;

monitor the administrative server VM log tile to determine that/whether the administrative server VM shut down correctly;

store any domain configuration files in a compressed file;

create and store log directories for the domain configuration files on each of one or more managed server VMs associated with the plurality of managed host servers;

transfer the compressed file comprising the domain configuration files to each of the managed server VMs;

unpack the compressed file at each of the managed server VMs;

configure a node manager for the administrative host server and each of the plurality of managed host servers;

monitor a node manager VM log file on each of the managed server VMs to determine that the node managers are successfully configured;

start up the administrative server VM using the node manager;

monitor the administrative server VM log file to determine that the administrative server VM starts up correctly;

assign the node manager to the domain;

shut down the administrative server VM using the node manager;

monitor the administrative server VM log the to determine that the administrative server VM shuts down correctly;

shut down the node manager;

start up the node manager;

monitor the node manager VM log file to determine that the node manager starts up correctly;

start up the administrative server VM using the node manager;

monitor the administrative server VM log file to determine that the administrative server VM starts up correctly;

start up each managed server VM, for each of the one or more managed server VMs;

monitor managed server VM log files to determine that each managed server VM starts up correctly;

enroll each of the managed server VMs in the domain with the node manager;

shut down ail components of the domain;

start up the node manager; monitor the node manager VM log file to determine that the node manager starts up correctly;

start up the administrative server VM using the node manager; and monitor the administrative server VM log the to determine that the administrative server VM starts up correctly.

2. The computing device system of claim 1, wherein the one or more computer processing devices are further configured to execute computer-readable program code to:

check a plurality of ports to determine whether there are any port conflicts;

check for system level entropy;

check to see if the domain already exists;

determine whether product binaries are currently installed; and define functions based on the received plurality of original parameters.

3. The computing device system of claim 1, wherein the one or more computer processing devices are further configured to execute computer-readable program code to:

in response to configuring the domain, generate a unique and random password string that is specific to the domain;

encrypt the unique and random password string; and store the encrypted unique and random password string.

4. The computing device system of claim 1, wherein the one or more computer processing devices are further configured to execute computer-readable program code to:

in response to unpacking the compressed file, generate a unique and random password string that is specific to each of the managed server VMs;

encrypt each of the unique and random password strings for each of the managed server VMs; and store each of the encrypted unique and random password strings on their respective managed server VM.

5. The computing device system of claim 1, wherein the one or more computer processing devices are further configured to execute computer-readable program code to:

in response to monitoring the managed server VM log files to determine that each managed server VM starts up correctly; connect each managed server VM to the node manager.

6. The computing device system of claim 1, wherein the one or more computer processing devices are further configured to execute computer-readable program code to:
in response to enrolling each of the managed server VMs in the domain with the node manager, start up a program to be executed on the managed server VMs, based on the received plurality of original parameters;
monitor the managed server VM log files to determine that/whether the program starts up correctly;
shut down the program to be executed on the managed server VMs; and
monitor the managed server VM log files to determine that/whether the program shuts down correctly.

7. The computing device system of claim 1, wherein the one or more computer processing devices are further configured to execute computer-readable program code to:
provide a report that the domain is prepared for deployment.

8. The computing device system of claim 1, wherein the one or more computer processing devices are further configured to execute computer-readable program code to:
provide the error log report in response to:
the administrative server VM log file determining that the administrative server VM does not start up correctly;
the administrative server VM log file determining that the administrative server VM does not shut down correctly;
one of the managed server VM log files determining that the one of the managed server VMs does not start up correctly;
one of the managed server VM log files determining that the one of the managed server VMs does not shut down correctly;
the node manager VM log file determining that the node manager does not start up correctly; or
the node manager VM log file determining that the node manager does not shut down correctly.

9. The computing device system of claim 1, wherein the one or more computer processing devices are further configured to execute computer-readable program code to:
receive, via said communication device, a plurality of new parameters comprising hardware, software, and network information associated with adjusting the domain;
configure a new cluster of managed server VMs in the domain;
shut down the administrative server VM;
monitor the administrative server VM log file to determine that the administrative server VM shuts down correctly;
start up the administrative server VM using the node manager;
monitor the administrative server VM log file to determine that the administrative server VM starts up correctly;
start up each managed server VM, for each of the one or more managed server VMs;
monitor the managed server VM log files to determine that each managed server VM starts up correctly;
enroll each of the managed server VMs in the domain with the node manager;
shut down each managed server VM;
monitor the managed server VM log files to determine that each managed server VM shut down correctly;
shut down the administrative server VM;
monitor the administrative server VM log file to determine that the administrative server VM shuts down correctly;
shut down the node manager;
monitor the node manager log file to determine that the node manager shuts down correctly;
start up the node manager;
monitor the node manager log file to determine that the node manager starts up correctly;
start up the administrative server VM using the node manager;
monitor the administrative server VM log file to determine that the administrative server VM starts up correctly;
start up each managed server VM, for each of the one or more managed server VMs; and
monitor the managed server VM log files to determine that each managed server VM starts up correctly.

10. The computing device system of claim 9, wherein the plurality of new parameters comprise at least a request for at least one new managed server VM.

11. The computing device system of claim 9, wherein the plurality of new parameters comprise:
an input of at least a same application name as in the plurality of original parameters, and
an input of a next sequential managed server number, as compared to an input of at least one managed server number as in the plurality of new parameters.

12. The computing device system of claim 9, wherein the one or more computer processing devices are further configured to execute computer-readable program code to:
in response to receiving the plurality of new parameters, check the plurality of ports to determine whether there are any port conflicts;
determine whether product binaries are currently installed; and
define new functions based on the received plurality of new parameters.

13. The computing device system of claim 9, wherein the one or more computer processing devices are further configured to execute computer-readable program code to:
in response to configuring the new cluster of managed server VMs in the domain, generate a unique and random password string that is specific to each managed server VM in the new cluster of managed server VMs;
encrypt each of the unique and random password strings for each of the managed server VM in the new cluster of managed server VMs; and
store each of the encrypted unique and random password strings on their respective managed server VM in the new cluster of managed server VMs.

14. The computing device system of claim 9, wherein the one or more computer processing devices are further configured to execute computer-readable program code to:
in response to monitoring the managed server VM log files to determine that each managed server VM starts up correctly, connect each managed server VM to the node manager.

15. The computing device system of claim 9, wherein the one or more computer processing devices are further configured to execute computer-readable program code to:
in response to monitoring the managed server VM log files to determine that each managed server VM shut down correctly, start up a program to be executed on the managed server VMs, based on the received plurality of new parameters;

monitor the managed server VM log files to determine that the program starts up correctly;

shut down the program to be executed on the managed server VMs; and monitor the managed server VM log files to determine that the program shuts down correctly.

16. The computing device system of claim 9, wherein the one or more computer processing devices are further configured to execute computer-readable program code to:

provide a report that the new cluster of managed server VMs in the domain are prepared for deployment.

17. A computer program product for deploying a server system, whereby the computer program product comprising at least one non-transitory computer readable medium for storing computer readable instructions, the computer readable instructions when executed causing:

a computing device system for deploying the server system, whereby the computing device system communicates user requests to a plurality of managed host servers for a purpose of executing instructions on the plurality of managed host servers, the computing device system comprising:

one or more storage devices with computer-readable program code store thereon;

a communication device;

one or more computer processing devices operatively coupled to said one or more storage device and said communication device, wherein said one or more computer processing devices are configured to execute the computer-readable program code stored on said storage device to cause the computing device system to perform steps of:

receiving from the user, via the communication device, a plurality of original parameters comprising hardware, software, and network information associated with building a domain, wherein the domain is new;

in response to receiving the plurality of original parameters, searching a keystore in each of the plurality of managed host servers for a transport layer security certificate and a secure sockets layer certificate;

in response to determining that the keystore found in the plurality of managed host servers does not include the transport layer security certificate or the secure sockets layer certificate, automatically transmitting an error log report and ending the execution of the one or more computer processing devices; or in response to determining that the keystore found in the plurality of managed host servers does include both the transport layer security certificate and the secure sockets layer certificate, not transmitting the error log report and not terminating the execution of the one or more computer processing devices for building the domain;

configuring the domain based on the received plurality of original parameters, wherein creating the domain comprises basic properties of the domain, including an administrative server virtual machine (VM) associated with an administrative host server;

starting the administrative server VM;

monitoring an administrative server VM log file to determine that the administrative server VM starts up correctly;

running a domain online configuration script;

shutting down the administrative server VM;

monitoring the administrative server VM log file to determine that the administrative server VM shut down correctly;

removing any content from the administrative server VM log file;

starting up the administrative server VM via a custom start script;

monitoring the administrative server VM log file to determine that the administrative server VM starts up correctly;

shutting down the administrative server VM;

monitoring the administrative server VM log file to determine that/whether the administrative server VM shut down correctly;

storing any domain configuration files in a compressed file;

creating and store log directories for the domain configuration files on each of one or more managed server VMs associated with the plurality of managed servers;

transferring the compressed file comprising the domain configuration files to each of the managed server VMs;

unpacking the compressed file at each of the managed server VMs;

configuring a node manager for the administrative host server and each of the plurality of managed host servers;

monitoring a node manager VM log file on each of the managed server VMs to determine that the node managers are successfully configured;

starting up the administrative server VM using the node manager;

monitoring the administrative server VM log file to determine that the administrative server VM starts up correctly;

assigning the node manager to the domain;

shutting down the administrative server VM using the node manager;

monitoring the administrative server VM log file to determine that the administrative server VM shuts down correctly;

shutting down the node manager;

starting up the node manager;

monitoring the node manager VM log file to determine that the node manager starts up correctly;

starting up the administrative server VM using the node manager;

monitoring the administrative server VM log file to determine that the administrative server VM starts up correctly;

starting up each managed server VM;

monitoring managed server VM log files to determine that each managed server VM starts up correctly;

enrolling each of the managed server VMs in the domain with the node manager;

shutting down all components of the domain;

starting up the node manager;

monitoring the node manager VM log file to determine that the node manager starts up correctly;

starting up the administrative server VM using the node manager; and monitoring the administrative server VM log file to determine that the administrative server VM starts up correctly.

18. The computer program product of claim 17, wherein the computer readable instructions further perform the steps comprising:

receiving, via said communication device, a plurality of new parameters comprising hardware, software, and network information associated with adjusting the domain;
configuring a new cluster of managed server VMs in the domain;
shutting down the administrative server VM;
monitoring the administrative server VM log file to determine that the administrative server VM shuts down correctly;
starting up the administrative server VM using the node manager;
monitoring the administrative server VM log file to determine that the administrative server VM starts up correctly;
starting up each managed server VM;
monitoring the managed server VM log files to determine that each managed server VM starts up correctly;
enrolling each of the managed server VMs in the domain with the node manager;
shutting down each managed server VM;
monitoring the managed server VM log files to determine that each managed server VM shut down correctly;
shutting down the administrative server VM;
monitoring the administrative server VM log file to determine that the administrative server VM shuts down correctly;
shutting down the node manager;
monitoring the node manager log file to determine that the node manager shuts down correctly;
starting up the node manager;
monitoring the node manager log file to determine that the node manager starts up correctly;
starting up the administrative server VM using the node manager;
monitoring the administrative server VM log file to determine that the administrative server VM starts up correctly;
starting up each managed server VM; and
monitoring the managed server VM log files to determine that each managed server VM starts up correctly.

19. A computer implemented method perform by a computing device system for deploying a server system, whereby the computing device system communicates user requests to a plurality of managed host servers for a purpose of executing instructions on the plurality of managed host servers, the computing device system comprising:
one or more storage devices with computer-readable program code store thereon;
a communication device;
one or more computer processing devices operatively coupled to said one or more storage device and said communication device, wherein said one or more computer processing devices are configured to execute the computer-readable program code stored on said storage device to cause the computing device system to perform said computer implemented method comprising:
receive from the user, via said communication device, a plurality of original parameters comprising hardware, software, and network information associated with building a domain, wherein the domain is new;
in response to receiving the plurality of original parameters, search a keystore in each of the plurality of managed host servers for a transport layer security certificate and a secure sockets layer certificate;
in response to determining that the keystore of one found in the plurality of managed host servers does not include the transport layer security certificate or the secure sockets layer certificate, automatically transmit an error log report and end the execution of the one or more computer processing devices; or
in response to determining that the keystore found in the plurality of managed host servers does include both the transport layer security certificate and the secure sockets layer certificate, do not transmit the error log report and do not terminate the execution of the one or more computer processing devices for building the domain;
configure the domain based on the received plurality of original parameters, wherein creating the domain comprises basic properties of the domain, including an administrative server virtual machine (VM) associated with an administrative host server;
start the administrative server VM;
monitor an administrative server VM log file to determine that the administrative server VM starts up correctly;
run a domain online configuration script;
shut down the administrative server VM;
monitor the administrative server VM log file to determine that the administrative server VM shut down correctly;
remove any content from the administrative server VM log file;
start up the administrative server VM via a custom start script;
monitor the administrative server VM log file to determine that the administrative server VM starts up correctly;
shut down the administrative server VM;
monitor the administrative server VM log file to determine that/whether the administrative server VM shut down correctly;
store any domain configuration files in a compressed file;
create and store log directories for the domain configuration files on each of one or more managed server VMs associated with the plurality of managed host servers;
transfer the compressed file comprising the domain configuration files to each of the managed server VMs;
unpack the compressed file at each of the managed server VMs;
configure a node manager for the administrative host server and each of the plurality of managed host servers;
monitor a node manager VM log file on each of the managed server VMs to determine that the node managers are successfully configured;
start up the administrative server VM using the node manager;
monitor the administrative server VM log file to determine that the administrative server VM starts up correctly;
assign the node manager to the domain;
shut down the administrative server VM using the node manager;
monitor the administrative server VM log file to determine that the administrative server VM shuts down correctly;
shut down the node manager;
start up the node manager;
monitor the node manager VM log file to determine that the node manager starts up correctly;
start up the administrative server VM using the node manager;

monitor the administrative server VM log file to determine that the administrative server VM starts up correctly;
start up each managed server VM, for each of the one or more managed server VMs;
monitor managed server VM log files to determine that each managed server VM starts up correctly;
enroll each of the managed server VMs in the domain with the node manager; shut down all components of the domain;
start up the node manager; monitor the node manager VM log file to determine that the node manager starts up correctly;
start up the administrative server VM using the node manager; and
monitor the administrative server VM log file to determine that the administrative server VM starts up correctly.

20. The computer implemented method of claim 19, further comprising:
receive, via said communication device, a plurality of new parameters comprising hardware, software, and network information associated with adjusting the domain;
configure a new cluster of managed server VMs in the domain;
shut down the administrative server VM;
monitor the administrative server VM log file to determine that the administrative server VM shuts down correctly;
start up the administrative server VM using the node manager;
monitor the administrative server VM log file to determine that the administrative server VM starts up correctly;
start up each managed server VM, for each of the one or more managed server VMs;
monitor the managed server VM log files to determine that each managed server VM starts up correctly;
enroll each of the managed server VMs in the domain with the node manager;
shut down each managed server VM;
monitor the managed server VM log files to determine that each managed server VM shut down correctly;
shut down the administrative server VM;
monitor the administrative server VM log file to determine that the administrative server VM shuts down correctly;
shut down the node manager;
monitor the node manager log file to determine that the node manager shuts down correctly;
start up the node manager;
monitor the node manager log file to determine that the node manager starts up correctly;
start up the administrative server VM using the node manager;
monitor the administrative server VM log file to determine that the administrative server VM starts up correctly;
start up each managed server VM, for each of the one or more managed server VMs; and
monitor the managed server VM log files to determine that each managed server VM starts up correctly.

* * * * *